(12) United States Patent
Mazur et al.

(10) Patent No.: US 8,804,261 B2
(45) Date of Patent: Aug. 12, 2014

(54) OVER-THE-RAIL WRITE DRIVER FOR MAGNETIC STORAGE SYSTEMS

(75) Inventors: Paul Mark Mazur, Cottage Grove, MN (US); Michael Joseph Peterson, Eagan, MN (US)

(73) Assignee: LSI Corporation, San Jose, CA (US)

( * ) Notice: Subject to any disclaimer, the term of this patent is extended or adjusted under 35 U.S.C. 154(b) by 82 days.

(21) Appl. No.: 13/560,815

(22) Filed: Jul. 27, 2012

(65) Prior Publication Data
US 2014/0029127 A1    Jan. 30, 2014

(51) Int. Cl.
*G11B 5/09* (2006.01)
*G11B 5/02* (2006.01)

(52) U.S. Cl.
USPC .................. 360/46; 360/61; 360/62; 360/67; 360/68

(58) Field of Classification Search
None
See application file for complete search history.

(56) References Cited

U.S. PATENT DOCUMENTS

| | | | | |
|---|---|---|---|---|
| 5,822,141 A * | 10/1998 | Chung et al. | ..................... | 360/46 |
| 5,841,603 A * | 11/1998 | Ramalho et al. | ................. | 360/68 |
| 6,191,643 B1 * | 2/2001 | Nayebi et al. | ................. | 327/536 |
| 6,236,247 B1 * | 5/2001 | Ngo | .............................. | 327/110 |
| 6,366,421 B2 * | 4/2002 | Teterud | .......................... | 360/68 |
| 6,512,645 B1 * | 1/2003 | Patti et al. | ....................... | 360/46 |
| 6,549,353 B1 | 4/2003 | Teterud | | |
| 6,650,494 B2 | 11/2003 | Kim | | |
| 6,798,591 B2 * | 9/2004 | Barnett et al. | .................. | 360/46 |
| 6,813,110 B2 * | 11/2004 | Leighton et al. | ................ | 360/68 |
| 6,917,484 B2 * | 7/2005 | Ranmuthu | ..................... | 360/46 |
| 7,035,028 B2 * | 4/2006 | Venca et al. | .................... | 360/46 |
| 7,154,693 B2 * | 12/2006 | Price, Jr. | ......................... | 360/68 |
| 7,242,544 B2 * | 7/2007 | Price et al. | ..................... | 360/46 |
| 7,280,300 B1 * | 10/2007 | Aram et al. | ..................... | 360/68 |
| 7,372,649 B2 * | 5/2008 | VanEaton et al. | .............. | 360/46 |
| 7,453,659 B2 * | 11/2008 | Ranmuthu | ...................... | 360/68 |
| 2006/0132198 A1 * | 6/2006 | Sharifi et al. | .................. | 327/110 |
| 2008/0204914 A1 | 8/2008 | Hashizume | | |
| 2008/0265951 A1 * | 10/2008 | Ngo et al. | ..................... | 327/108 |

* cited by examiner

*Primary Examiner* — Dismery Mercedes
(74) *Attorney, Agent, or Firm* — Otterstedt, Ellenbogen & Kammer, LLP

(57) ABSTRACT

A write driver circuit for generating a write current pulse for use by a magnetic write head includes an output stage adapted for connection with the magnetic write head and a charge storage circuit connected with the output stage. The charge storage circuit is operative in a first mode to store a prescribed charge and is operative in a second mode to transfer at least a portion of the charge stored therein to the output stage to thereby enable an output voltage level of the output stage to extend beyond a voltage supply rail of the write driver circuit. A control circuit in the write driver circuit is operative to generate at least one control signal for selectively controlling a mode of operation of the charge storage circuit.

26 Claims, 5 Drawing Sheets

OVER-THE-RAIL WRITE DRIVER FOR MAGNETIC STORAGE SYSTEMS

BACKGROUND

The demand for improved data storage techniques and systems continues to grow. Hard disk drives utilizing magneto-resistive heads to write data to and read data from one or more spinning magnetic storage media are one of the most important and widespread devices in the data storage field.

Hard disk drives store binary encoded information as regions of magnetic flux on a medium having a magnetic surface coating. There has been a continual push to encode these magnetic regions on the disk as densely as practical, so as to increase the amount of storage capability of the hard disk drive. However, increasing areal density requirements places a burden on write circuitry in the hard disk drive to generate smaller recorded patterns on the disk. Moreover, in an effort to save power, particularly with portable devices, there has been a push to reduce supply voltage, which creates an even greater challenge for the write circuitry.

SUMMARY

Embodiments of the invention are broadly related to techniques, for use in a magnetic storage device, for generating a write current having a peak amplitude that is greater than that generated by a traditional write driver given the same supply voltage.

In accordance with an embodiment of the invention, a write driver circuit for generating a write current pulse for use by a magnetic write head includes an output stage adapted for connection with the magnetic write head and a charge storage circuit connected with the output stage. The charge storage circuit is operative in a first mode to store a prescribed charge and is operative in a second mode to transfer at least a portion of the charge stored therein to the output stage to thereby enable an output voltage level of the output stage to extend beyond a voltage supply rail of the write driver circuit. A control circuit in the write driver circuit is operative to generate at least one control signal for selectively controlling a mode of operation of the charge storage circuit.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
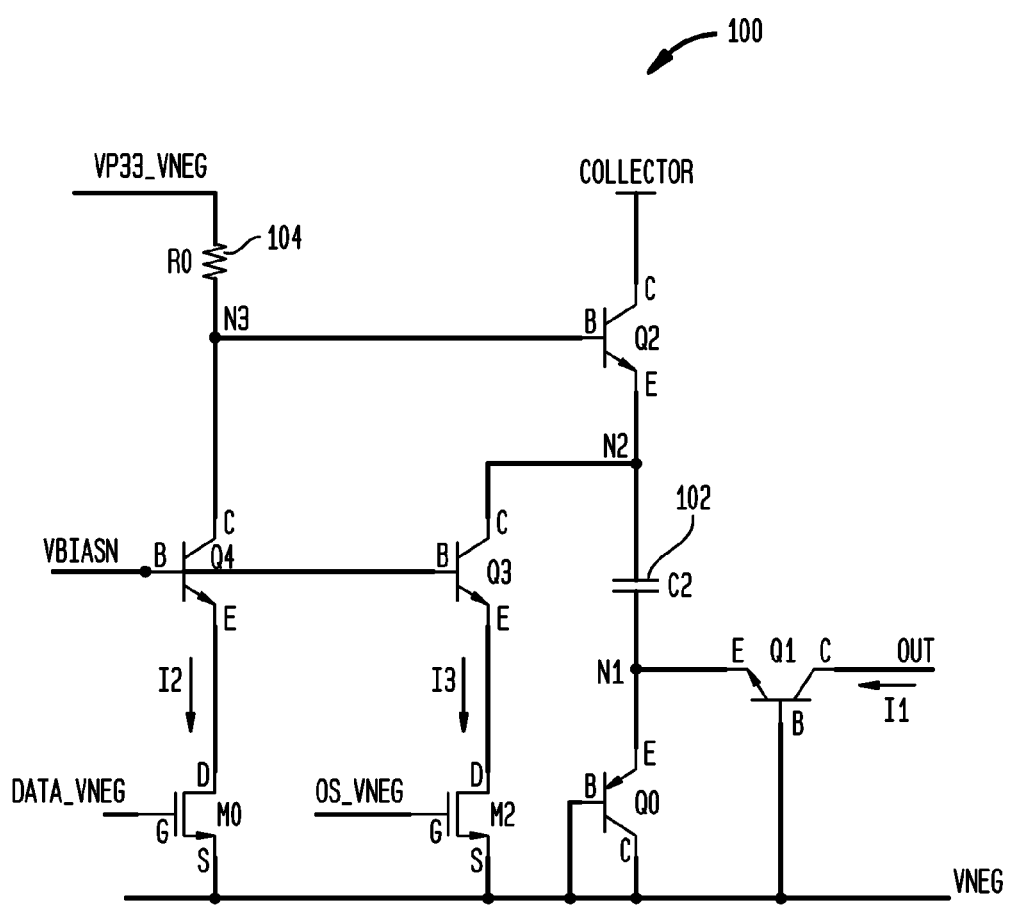
FIG. 1 is a schematic diagram depicting at least a portion of an exemplary pull-down write driver circuit, according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative low-voltage write driver circuits for controlling current through a magnetic write head in a hard disk drive. It should be understood, however, that embodiments of the invention are not limited to these or any other particular circuits and/or methods. Rather, embodiments of the invention are more broadly related to techniques for generating a write current having a peak amplitude that is greater than that generated by a traditional write driver given the same supply voltage, among other benefits. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

As a preliminary matter, for the purposes of clarifying and describing embodiments of the invention, the following table provides a summary of certain acronyms and their corresponding definitions, as the terms are used herein:

| Table of Acronym Definitions | |
|---|---|
| Acronym | Definition |
| MOSFET | Metal-oxide-semiconductor field-effect transistor |
| MISFET | Metal-insulator-semiconductor field-effect transistor |
| PMOS | P-channel metal-oxide-semiconductor |
| PFET | P-channel field-effect transistor |
| NMOS | N-channel metal-oxide-semiconductor |
| NFET | N-channel field-effect transistor |
| CMOS | Complementary metal-oxide-semiconductor |
| MOS | Metal-oxide-semiconductor |
| BJT | Bipolar junction transistor |
| IC | Integrated circuit |

For the purpose of describing and claiming embodiments of the invention, the term MOSFET as used herein is intended to be construed broadly and to encompass any type of metal-insulator-semiconductor field-effect transistor. The term MOSFET is, for example, intended to encompass semiconductor field-effect transistors that utilize an oxide material as their gate dielectric, as well as those that do not. In addition, despite a reference to the term "metal" in the acronym MOSFET, the term MOSFET is also intended to encompass semiconductor field-effect transistors wherein the gate is formed from a non-metal such as, for instance, polysilicon.

Although implementations of the present invention described herein may be implemented using p-channel MISFETs (hereinafter called "PMOS" or "PFET" devices) and re-channel MISFETs (hereinafter called "NMOS" or NFET devices), as may be formed using a CMOS fabrication process, it is to be appreciated that the invention is not limited to such transistor devices and/or such a fabrication process, and that other suitable devices, such as, for example, FinFETs, bipolar junction transistors (BJTs), etc., and/or fabrication processes (e.g., bipolar, BiCMOS, etc.), may be similarly employed, with or without modification to the circuits described herein, as will be understood by those skilled in the art. Moreover, although preferred embodiments of the invention are typically fabricated in a silicon wafer, embodiments of the invention can alternatively be fabricated in wafers comprising other materials, including but not limited to Gallium Arsenide, Indium Phosphide, etc.

In magnetic data storage and retrieval systems, a magnetoresistive head is used to write binary (i.e., two-state) data to and read binary data from a magnetic storage medium, such as, for example, a magnetic tape or magnetic disk. A write (or recording) head comprises an inductive coil which is adapted to store binary encoded information as magnetic flux patterns imparted on the magnetic storage medium as the medium passes by the write head. A direction of the individual magnetic flux patterns is controlled as a function of the direction of current passing through the write head, with alternate directions being indicative of respective logical states of the data to be stored.

As previously stated, increasing areal density requirements places a significant burden on write circuitry to generate smaller recorded flux patterns on the magnetic storage medium. To accomplish this, the write circuitry must be capable of quickly switching the direction of current passing through the write head. Switching rate, which is broadly defined herein as a measure of how often the write circuitry can reverse current direction through the inductive coil of the write head per unit time, determines a maximum linear spatial density of data along a track in the magnetic storage medium. Ultimately, a higher switching rate yields denser data storage and thus greater data storage capacity for the magnetic storage medium.

In an effort to save power, particularly in portable devices, there has been a push to reduce supply voltage, which places an even greater burden on the write circuitry. In order to maintain the same peak overshoot amplitude (which is desirable for generating fast rise and fall times of the write current pulse) with lower available supply voltage levels, either the head interconnect impedance must be lowered (thus adding considerable cost), the write driver circuitry must generate a write pulse into the head interconnect that is greater than the voltage supply rail, or both.

FIG. 1 is a schematic diagram depicting at least a portion of an exemplary write driver circuit 100, according to an embodiment of the invention. Write driver circuit 100 represents a pull-down portion of an overall write driver formed in accordance with embodiments of the invention. The write driver circuit 100 is suitable for use in controlling a current through a write head in a magnetic storage device, such as, for example, a hard disk drive. As will be described in further detail below, the write driver circuit 100 according to an embodiment of the invention provides a mechanism for advantageously generating a write pulse having a peak overshoot that is greater than that of a traditional write driver given the same voltage supply level, and moreover still provides precise control of overshoot current amplitude and duration. In this case, write driver circuit 100 is adapted to generate an overshoot write current that is capable of extending below a first (lower) voltage supply rail, which in this embodiment is VNEG.

With reference to FIG. 1, the write driver circuit 100 includes a PNP BJT, Q0, a first NPN BJT, Q1, a second NPN BJT, Q2, a third NPN BJT, Q3, a fourth NPN BJT, Q4, a first NFET, M0 and a second NFET, M2. Q0 is connected in a diode configuration, with a collector (C) and a base (B) of Q0 adapted for connection with a first voltage supply rail, which in this embodiment is VNEG. In an illustrative embodiment, VNEG is −3.0 volts, although embodiments of the invention are not limited to any specific voltage level for the first voltage supply rail. Although the write driver circuit 100 is depicted using BJTs Q0, Q1, Q2, Q3 and Q4, it is to be appreciated that alternative embodiments of the invention can employ other transistor types (e.g., NFETs, PFETs, finFETs, etc.) in substitution therefor and the circuit will function similarly. By way of example only, one or more NPN BJTs Q1, Q2, Q3 and Q4 can be replaced by corresponding NFETs, with little or no modification to the circuit 100, as will become apparent to those skilled in the art. Q0 may also be replaced with a diode (i.e., p-n junction device), since it is already connected in a diode configuration. Furthermore, NFETs M0 and M2 can be replaced by corresponding NPN BJT devices, with modification to the circuitry generating control signals data_vneg and os_vneg (or addition of voltage level shifting circuitry). If M0 and M2 were replaced with BJT counterparts, Q3 and Q4 may be eliminated.

An emitter (E) of Q0 is connected with an emitter of Q1 at node N1. A base of Q1 is adapted for connection with first supply voltage VNEG, and a collector of Q1 is adapted for connection with a write head and forms an output, OUT, of the write driver circuit 100 for generating a write current I1 supplied to a write head (not explicitly shown) through a write head interconnect, or an alternative connection. A direction of the write current I1 into the write head will be dependent upon a state of the data being written to the storage medium.

An emitter of Q2 is coupled with the emitter of Q0 through a capacitor 102 having a capacitance C2 associated therewith. Specifically, a first terminal of capacitor 102 is connected with the emitters of Q0 and Q1 at node N1, and a second terminal of capacitor 102 is connected with the emitter of Q2 at node N2. Although shown in FIG. 1 as a discrete component, capacitor 102 can be implemented using any capacitive element (or elements), including, but not limited to, one or more of an MOS capacitor, junction capacitor, well capacitor, etc., as will become apparent to those skilled in the art. A base of Q2 is connected with a first terminal of a resistor 104 having a resistance R0 associated therewith at node N3, and a collector of Q2 forms an open collector output, COLLECTOR, adapted to receive a source of current. A second terminal of resistor 104 is adapted for connection with a first reference voltage, which in this embodiment is VP33_VNEG. In an illustrative embodiment, VP33_VNEG is about 0 volts, although embodiments of the invention are not limited to any specific voltage level for the first reference voltage. In embodiments of the invention, the collector of Q2 is connected with the first reference voltage VP33_VNEG, with VP33_VNEG acting as a current source for Q2.

In this embodiment, Q1 forms at least part of an output stage and capacitor 102 forms at least part of a charge storage circuit connected with the output stage in the write driver circuit 100. The charge storage circuit is operative in a first mode to store a prescribed charge (supplied via Q2) and is operative in a second mode to transfer at least a portion of the charge stored therein to the output stage to thereby enable an output voltage level of the output stage (at node OUT) to extend beyond a voltage supply rail of the write driver circuit. Thus, where the voltage supply rail is the lower supply voltage VNEG, the charge storage circuit enables the output node OUT to go down to or below the level of VNEG.

A collector of Q3 is connected with the emitter of Q2 at node N2, bases of Q3 and Q4 are adapted to receive a bias signal, VBIASN, and a collector of Q4 is connected with resistor 104 at node N3. An emitter of Q3 is connected with a drain (D) of NFET M2, a source (S) of M2 is adapted for connection with the first voltage supply rail VNEG, and a gate (G) of M2 is adapted to receive a first control signal, OS_VNEG, supplied thereto. It is to be appreciated that, because a metal-oxide-semiconductor (MOS) device is symmetrical in nature, and thus bi-directional, the assignment of source and drain designations in the MOS device is essentially arbitrary. Therefore, the source and drain of a given MOS device may be referred to herein generally as first and second source/drain, respectively, where "source/drain" in this context denotes a source or a drain.

An emitter of Q4 is connected with a drain of NFET M0, a source of M0 is adapted for connection with the first voltage supply rail VNEG, and a gate of M0 is adapted to receive a second control signal, DATA_VNEG, supplied thereto. In this manner, NFET M0 essentially serves as a switch for controlling the flow of current I2 through Q4 as a function of control signal DATA_VNEG. Likewise, NFET M2 essentially serves as a switch for controlling the flow of current I3 through Q3 as a function of control signal OS_VNEG. A magnitude of each of the currents I2 and I3 is controlled as a function of the bias signal VBIASN and/or a size (e.g., ratio of channel width to channel length) of NFETs M0 and M2, respectively.

In an alternative embodiment, the current I3 can be controlled by implementing M2 as an array of N smaller, parallel-connected MOS segments (e.g., fingers), each segment being independently controlled by a corresponding one of respective control signals OS_VNEG1 through OS_VNEGn (not explicitly shown, but represented collectively by signal OS_VNEG), where n is an integer, so as to form a programmable current source. Thus, by selectively turning on a portion of the parallel-connected MOS segments (via a selected subset of corresponding control signals), a magnitude of the current I3, and hence a magnitude of the output current I1, can be precisely controlled. To a first order, current I3 is substantially equal to current I1, and therefore precise control of I3 enables precise control of the output current I1.

An operation of the illustrative write driver circuit 100 will now be described. As previously stated, the write driver circuit 100 provides a novel mechanism for generating a write pulse having a peak overshoot that is greater than that of a traditional write driver given the same voltage supply level. To accomplish this, overshoot current generated by M2 and Q3 does not flow directly to the write head pin (OUT), but instead flows through the series capacitor 102 and output device Q1. Capacitor 102, when charged prior to the onset of the overshoot current pulse, effectively extends the voltage range of the write driver circuit 100 at the output node OUT below the voltage supply rail VNEG, since the base of Q1 is tied to VNEG. The onset of the overshoot current pulse is selectively controlled as a function of control signal OS_VNEG, such that when signal OS_VNEG is a high level (e.g., −1.8 volts, for this example, assuming VNEG is at −3.0 volts), NFET M2 turns on allowing current to flow from output OUT, through a path including Q1, C2, Q3 and M2, to the supply rail VNEG. Since the write driver circuit 100 is configured such that Q2 is turned off when M2 turns on, there is no current flowing through Q2; current flows through Q2 only when recharging C2.

The capacitor 102 is discharged during the onset of the overshoot current pulse (i.e., when control signal OS_VNEG is high) and is recharged after the pulse is over (i.e., when control signal OS_VNEG is low) so that it is ready for onset of the next overshoot current pulse. Recharging of the capacitor 102 takes places when the control signal DATA_VNEG is low, thereby turning off (i.e., disabling or deactivating) NFET M0. With control signal DATA_VNEG low, current will not flow through Q3 and M2 to the supply rail VNEG; rather, the charging current supplied by Q2 flows through capacitor 102 and diode-connected Q0 to the supply rail VNEG. Q1 is turned off during the charging of capacitor 102, since Q0 ensures that node N1 is about one $V_{BE}$ (base-emitter voltage) above the voltage supply rail VNEG. With the voltage at the emitter (node N1) of Q1 above the voltage at its base, Q1 remains turned off.

As previously stated, the current source comprising Q4 and M0 is turned off during the charging of capacitor 102 as a result of control signal DATA_VNEG being low, and thus current I2 will be substantially zero. With no current I2 flowing, the resistor 104 functions essentially as a pull-up device, allowing the base of Q2 at node N3 to be pulled up substantially to the first reference voltage VP33_VNEG, thereby turning on Q2 and supplying the current for charging capacitor 102. Once the current source Q4 and M0 generating the current I2 is enabled at the onset of the overshoot current pulse, by asserting the signal DATA_VNEG (e.g., high level), a voltage drop across resistor 104 (R0•I2) will pull the base of Q2 low through Q4 and M0, thereby turning off Q2.

Although embodiments of the invention are not limited to any specific value of the first reference voltage VP33_VNEG, the level of VP33_VNEG is preferably set high enough so that the capacitor 102 is charged to a voltage that is greater than the sum of the base-emitter drop of Q1 ($V_{BE,Q1}$), a voltage headroom at node N2 ($V_{N2}$) required for devices M2 and Q3 to operate sufficiently (e.g., to avoid operation of Q3 in saturation), and an additional voltage amount (ΔV) by which capacitor 102 is discharged throughout a duration of the overshoot current pulse (i.e., VP33_VNEG≥VNEG+$V_{BE,Q1}$+$V_{N2}$+ΔV). This additional voltage amount (ΔV) is dependent upon the duration and amplitude of the overshoot current pulse. The duration of the overshoot current pulse is precisely controlled as a function of the signal OS_VNEG (e.g., the amount of time OS_VNEG is high), and the amplitude of the overshoot current pulse is precisely controlled as a function of the magnitude of the current I3 generated by the current source comprising Q3 and M2.

In the write driver circuit 100, Q1 is the output device. When generating the overshoot current pulse, the emitter of Q1 at node N1 will be a base-emitter voltage ($V_{BE}$) below the first voltage supply rail VNEG; hence, the voltage at node N1 is referred to herein as going "over-the-rail." In a traditional write driver, there is no mechanism present which enables a circuit node in the write driver to exceed the voltage supply rails. For example, consider a scenario in which a write driver circuit consists only of Q3 and M2, where the collector of Q3, acting as an output of the driver circuit, is coupled directly with the write head. In this scenario, the emitter of Q3 is well above the lower supply rail VNEG, and thus the output node cannot go below VNEG. In the write driver circuit 100, since the emitter of the output device Q1 can go a diode voltage ($V_{BE}$) below the voltage supply rail VNEG, the output OUT of the write driver, which is the collector of Q1, can be pulled down to the supply rail VNEG or even below without placing Q1 into saturation, which would cause distortion of the write current pulse. The further down the voltage at the collector of Q1 (OUT) can go, the larger is the output voltage that can be generated by the write driver circuit 100 and supplied to the head interconnect, thus increasing the overshoot peak amplitude.

Figure 2:
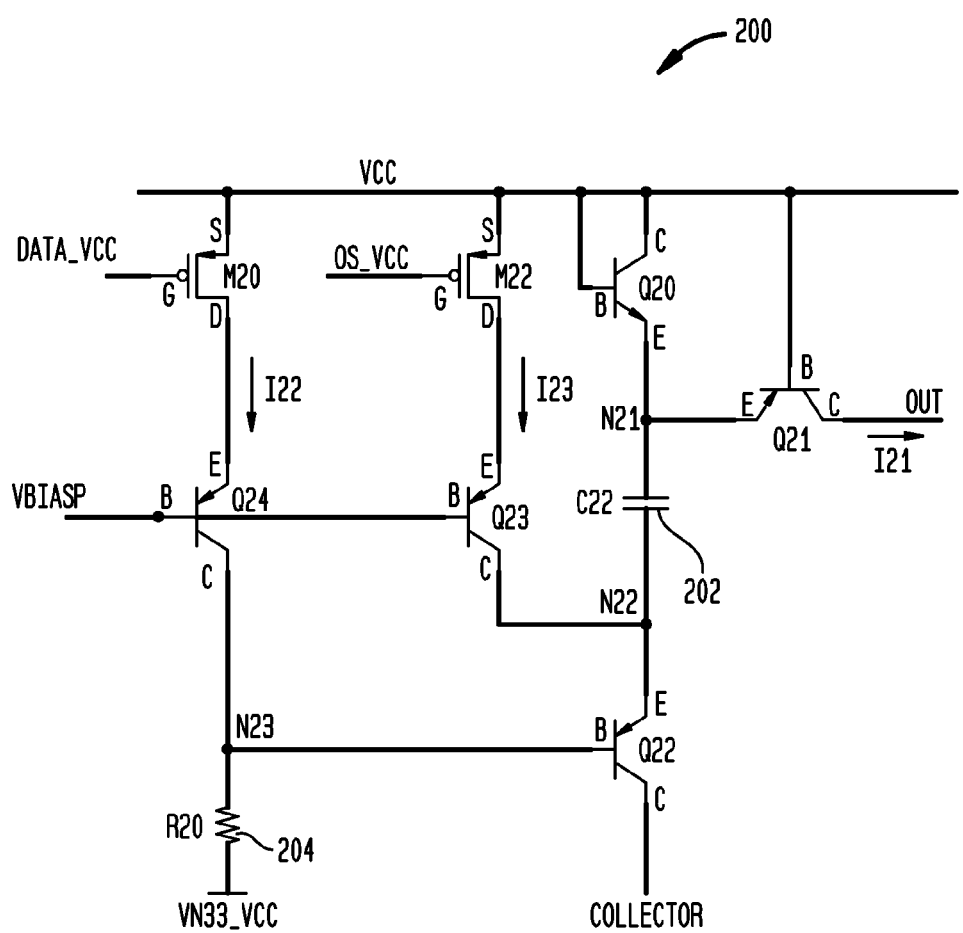
FIG. 2 is a schematic diagram depicting at least a portion of an exemplary pull-up write driver circuit, according to an embodiment of the invention.

FIG. 2 is a schematic diagram depicting at least a portion of an exemplary write driver circuit 200, according to an embodiment of the invention. Write driver circuit 200 represents a pull-up portion of an overall write driver formed in accordance with embodiments of the invention. Like the write driver circuit 100 shown in FIG. 1, the write driver circuit 200 according to an embodiment of the invention provides a mechanism for advantageously generating a write pulse having a peak overshoot that is greater than that of a traditional write driver given the same voltage supply level, and moreover still provides precise control of overshoot current amplitude and duration. In this case, write driver circuit 200 is adapted to generate an overshoot write current that is capable of extending above a second voltage supply rail, which in this embodiment is VCC.

With reference now to FIG. 2, the write driver circuit 200 includes an NPN BJT, Q20, a first PNP BJT, Q21, a second PNP BJT, Q22, a third PNP BJT, Q23, a fourth PNP BJT, Q24, a first PFET, M20 and a second PFET, M22. Q20 is connected in a diode configuration, with a collector and a base of Q20 adapted for connection with the second voltage supply rail, which in this embodiment is VCC. In an illustrative embodiment, VCC is 5.0 volts, although embodiments of the invention are not limited to any specific voltage level for the second voltage supply rail. Although the write driver circuit 200 is depicted using BJTs Q20, Q21, Q22, Q23 and Q24, it is to be appreciated that alternative embodiments of the invention can employ other transistor types (e.g., NFETs, PFETs, finFETs, etc.) in substitution therefor and the circuit will function similarly. By way of example only, one or more PNP BJTs Q21, Q22, Q23 and Q24 can be replaced by corresponding PFETs, with little or no modification to the circuit 200, as will become apparent to those skilled in the art. Q20 may also be replaced with a diode (i.e., p-n junction device), since it is already connected in a diode configuration. Furthermore, PFETs M20 and M22 and be replaced by corresponding PNP BJT devices, with modification to the circuitry generating control signals DATA_VCC and OS_VCC (or addition of voltage level shifting circuitry). If M20 and M22 were replaced with BJT counterparts, Q23 and Q24 may be eliminated.

An emitter of Q20 is connected with an emitter of Q21 at node N21. A base of Q21 is adapted for connection with second supply voltage VCC, and a collector of Q21 is adapted for connection with a write head and forms an output, OUT, of the write driver circuit 200 for generating a write current I21 supplied to a write head (not explicitly shown) through a write head interconnect, or an alternative connection. A direction of the write current I21 into the write head will be dependent upon a state of the data being written to the storage medium.

An emitter of Q22 is coupled with the emitter of Q20 through a capacitor 202 having a capacitance C22 associated therewith. Specifically, a first terminal of capacitor 202 is connected with the emitters of Q20 and Q21 at node N21, and a second terminal of capacitor 202 is connected with the emitter of Q22 at node N22. Although shown in FIG. 2 as a discrete component, capacitor 202 can be implemented using any capacitive element (or elements), including, but not limited to, one or more of an MOS capacitor, junction capacitor, well capacitor, etc., as will become apparent to those skilled in the art. A base of Q22 is connected with a first terminal of a resistor 204 having a resistance R20 associated therewith at node N23, and a collector of Q22 forms an open collector output, COLLECTOR. A second terminal of resistor 204 is adapted for connection with a second reference voltage, which in this embodiment is VN33_VCC. In an illustrative embodiment, VN33_VCC is about 1.7 volts, although embodiments of the invention are not limited to any specific voltage level for the second reference voltage. In embodiments of the invention, the collector of Q22 is connected with the second reference voltage VN33_VCC, with VN33_VCC acting as a current sink for Q22.

In this embodiment, Q21 forms an output stage and capacitor 202 forms a charge storage circuit connected with the output stage in the write driver circuit 200. The charge storage circuit is operative in a first mode to store a prescribed charge and being operative in a second mode to transfer at least a portion of the charge stored therein to the output stage to thereby enable an output voltage level of the output stage (at node OUT) to extend beyond a voltage supply rail of the write driver circuit. Thus, where the voltage supply rail is the upper supply rail VCC, the charge storage circuit enables the output node OUT to go up to or above the level of VCC.

A collector of Q23 is connected with the emitter of Q22 at node N22, bases of Q23 and Q24 are adapted to receive a bias signal, VBIASP, and a collector of Q24 is connected with resistor 204 at node N23. An emitter of Q23 is connected with a drain of PFET M22, a source of M22 is adapted for connection with the second voltage supply rail VCC, and a gate of M22 is adapted to receive a third control signal, OS_VCC, supplied thereto. An emitter of Q24 is connected with a drain of PFET M20, a source of M20 is adapted for connection with the second voltage supply rail VCC, and a gate of M20 is adapted to receive a fourth control signal, DATA_VCC, supplied thereto. In this manner, PFET M20 essentially serves as a switch for controlling the flow of current I22 through Q24 as a function of control signal DATA_VCC. Likewise, PFET M22 essentially serves as a switch for controlling the flow of current I23 through Q23 as a function of control signal OS_VCC. A magnitude of the currents I22 and I23 are controlled as a function of the bias signal VBIASP and/or a size (e.g., ratio of channel width to channel length) of NFETs M20 and M22, respectively.

In an alternative embodiment, the current I23 can be controlled by implementing M22 as an array of M smaller, parallel-connected MOS segments, each segment being independently controlled by a corresponding one of respective control signals OS_VCC1 through OS_VCCm (not explicitly shown, but represented by signal OS_VCC), where m is an integer, so as to form a programmable current source. Thus, by selectively turning on a portion of the parallel-connected MOS segments (via a selected subset of the control signals), a magnitude of current I23, and hence a magnitude of the output current I21, can be precisely controlled. To a first order, current I23 is substantially equal to current I21, and therefore precise control of I23 enables precise control of the output current I21.

An operation of the illustrative write driver circuit 200 will now be described. As will become apparent, the operation of write driver circuit 200 is consistent with an operation of write driver circuit 100 shown in FIG. 1, only inverted. As previously stated, the write driver circuit 200 provides a novel mechanism for generating a write pulse having an overshoot peak amplitude that is greater than that of a traditional write driver given the same voltage supply level. To accomplish this, overshoot current (I23) generated by M22 and Q23 does not flow directly to the write head pin (OUT), but instead flows through the series capacitor 202 and output device Q21. Capacitor 202, when charged prior to the onset of the overshoot current pulse, effectively extends the voltage range of the write driver circuit 200 at the output node OUT above the voltage supply rail VCC, since the base of Q21 is tied to VCC. The onset of the overshoot current pulse is selectively controlled as a function of control signal OS_VCC, such that when signal OS_VCC is a low level (e.g., 1.7 volts, assuming VCC is at 5.0 volts), PFET M22 turns on allowing current to flow from supply rail VCC, through a path including M22, Q23, C22 and Q21, to the output OUT.

The capacitor 202 is discharged during the onset of the overshoot current pulse (i.e., when control signal OS_VCC is low) and is recharged after the pulse is turned off (i.e., when control signal OS_VCC is high) so that it is ready for onset of the next overshoot current pulse. Recharging of the capacitor 202 takes places when the control signal DATA_VCC is high (e.g., about 5.0 volts), thereby turning off (i.e., disabling or deactivating) PFET M20. With control signal DATA_VCC high, current will not flow through devices M22 and Q23 from the supply rail VCC; rather, the charging current supplied by Q22 flows through capacitor 202 and diode-connected Q20 from the supply rail VCC. Q21 is turned off during the charging of capacitor 202, since Q20 ensures that node N21 is about one $V_{BE}$ (base-emitter voltage) below the voltage supply rail VCC. With the voltage at the emitter (node N21) of Q21 below the voltage at its base, Q21 remains turned off.

The current source comprising devices Q24 and M20 is turned off during the charging of capacitor 202 as a result of control signal DATA_VCC being high, and thus current I22 will be substantially zero. With no current I22 flowing, the resistor 204 functions as a pull-down device, allowing the base of Q22 at node N23 to be pulled down substantially to the second reference voltage VN33_VCC, thereby turning on Q22 and supplying the current for charging capacitor 202. Once the current source Q24 and M20 generating the current I22 is enabled at the onset of the overshoot current pulse, by asserting the signal DATA_VCC (e.g., low level), a voltage drop across resistor 204 (R20•I22) will pull the base of Q22 high through Q24 and M20, thereby turning off Q22.

Although embodiments of the invention are not limited to any specific value of the second reference voltage VN33_VCC, the level of VN33_VCC is preferably set low enough so that the capacitor 202 is charged to a voltage that is greater than the sum of the base-emitter drop of Q21 ($V_{BE,Q21}$), a voltage headroom at node N22 ($V_{N22}$) required for devices M22 and Q23 to operate sufficiently (e.g., to avoid operation of Q23 in saturation), and an additional voltage amount ($\Delta V2$) by which capacitor 202 is discharged throughout a duration of the overshoot current pulse (i.e., VN33_VCC≤VCC−($V_{BE,Q21}+V_{N22}+\Delta V2$)). This additional voltage amount ($\Delta V2$) is dependent upon the duration and amplitude of the overshoot current pulse. The duration of the overshoot current pulse is precisely controlled as a function of the signal OS_VCC (e.g., the amount of time OS_VCC is high), and the amplitude of the overshoot current pulse is precisely controlled as a function of the magnitude of the current I23 generated by the current source comprising devices Q23 and M22.

In the write driver circuit 200, Q21 is the output device. When generating the overshoot current pulse, the emitter of Q21 at node N21 will be a base-emitter voltage ($V_{BE}$) above the second voltage supply rail VCC; hence, the voltage at node N21 is considered "over-the-rail." Since the emitter of the output device Q21 can go a diode voltage ($V_{BE}$) above the voltage supply rail VCC, the output OUT of the write driver, which is the collector of Q21, can be pulled up to the supply rail VCC or even above without placing Q21 into saturation. The further up the voltage at the collector of Q21 (OUT) can go, the larger is the output voltage that can be generated by the write driver circuit 200 and supplied to the head interconnect, thus increasing the overshoot peak amplitude.

Figure 3:
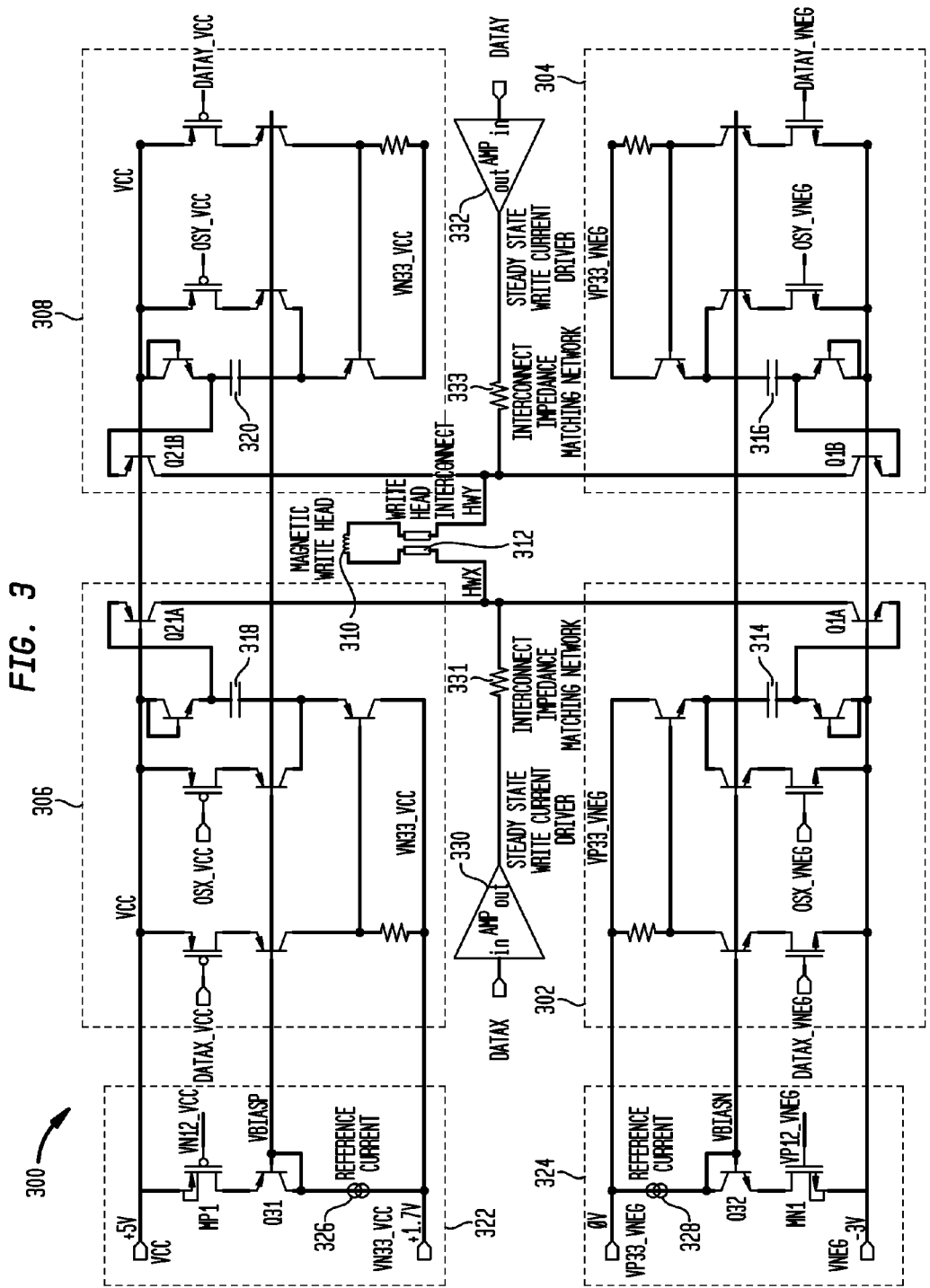
FIG. 3 is a top-level schematic diagram depicting at least a portion of an exemplary write circuit, according to an embodiment of the invention.

As previously stated, the illustrative write driver circuits 100 and 200 shown in FIGS. 1 and 2, respectively, are suitable for use in an overall write circuit formed in accordance with embodiments of the invention. By way of example only and without loss of generality, FIG. 3 is a top-level schematic diagram depicting at least a portion of an exemplary write circuit 300, according to an embodiment of the invention. With reference to FIG. 3, the write circuit 300 includes two pull-down write drivers and two pull-up write drivers connected with a magnetic write head using an H-bridge switching arrangement. As is known in the art, the term "H-bridge" refers to a connection arrangement of pull-up and pull-down devices at a pair of circuit nodes which resembles the letter "H." In the context of a magnetic storage device (e.g., hard disk drive), the H-bridge arrangement is an especially efficient architecture for applying write current to the terminals of a magnetic write head in either polarity, so as to write data of either binary state to a magnetic domain proximate to the write head.

Specifically, a first pull-down write driver 302, a second pull-down write driver 304, a first pull-up write driver 306 and a second pull-up write driver 308 are operatively coupled with a magnetic write head 310 via a write head interconnect 312, or an alternative connection means. An output of the first pull-up write driver 306 is connected with an output of the first pull-down write driver 302 at a first node, HWX, of the write head interconnect 312. Likewise, an output of the second pull-up write driver 308 is connected with an output of the second pull-down write driver 304 at a second node, HWY, of the write head interconnect 312. Node HWX of the write head interconnect 312 is connected with a corresponding first terminal of the magnetic write head 310, and node HWY of the write head interconnect is connected with a corresponding second terminal of the write head. The magnetic write head 310, being primarily inductive by nature, is represented in FIG. 3 as an inductor. Each of the pull-down write drivers 302 and 304 are preferably formed in a manner consistent with the exemplary write driver circuit 100 shown in FIG. 1. Similarly, each of the pull-up write drivers 306 and 308 are preferably formed in a manner consistent with the exemplary write driver circuit 200 shown in FIG. 2.

Each of the write drivers 302, 304, 306 and 308 are adapted to receive corresponding signals for controlling certain aspects of the write drivers, such as, for example, write current pulse duration and amplitude, charging current magnitude, and circuit enabling/disabling. More particularly, pull-down write driver 302 is adapted to receive a first control signal, DATAX_VNEG, a second control signal, OSX_VNEG, and a first bias signal VBIASN. As previously stated, signal DATAX_VNEG, which is comparable to signal DATA_VNEG described in conjunction with FIG. 1, controls activation of an output transistor device Q1A in write driver 302 (comparable to Q1 in FIG. 1). Thus, when at a low level (e.g., −3.0 volts, assuming a lower voltage supply rail of −3.0 volts), signal DATAX_VNEG disables output transistor device Q1A and enables charging of capacitor 314 in a manner consistent with that previously described in connection with the operation of write driver circuit 100 shown in FIG. 1. Signal OSX_VNEG, which is comparable to signal OS_VNEG described in conjunction with FIG. 1, is operative to control a duration of the overshoot current pulse generated by the write circuit 300 and VBIASN is operative to control overshoot current amplitude. In an alternative embodiment in which the NFET device adapted to receive control signal OSX_VNEG is formed as an array of N parallel-connected MOS segments, each segment is independently controlled by a corresponding one of control signals, OSX_VNEG1 through OSX_VNEGN (not explicitly shown, but represented by signal OSX_VNEG), where N is an integer, the magnitude of the overshoot current pulse can be precisely controlled.

Likewise, pull-down write driver 304 is adapted to receive a third control signal, DATAY_VNEG, a fourth control signal, OSY_VNEG, and the bias signal VBIASN. Signal DATAY_VNEG, which is comparable to signal DATA_VNEG described in conjunction with FIG. 1, controls activation of output transistor device Q1B in write driver 304

(comparable to Q1 in FIG. 1). Thus, when at a low level (e.g., −3.0 volts), signal DATAY_VNEG disables output transistor device Q1B and enables charging of capacitor 316 in a manner consistent with that previously described in connection with the operation of write driver circuit 100 shown in FIG. 1. Signal OSY_VNEG, which is comparable to signal OS_VNEG described in conjunction with FIG. 1, is operative to control a duration of the overshoot current pulse generated by the write circuit 300 and VBIASN is operative to control overshoot current amplitude. In an alternative embodiment in which the NFET device adapted to receive control signal OSY_VNEG is formed as an array of N parallel-connected MOS segments, each segment is independently controlled by a corresponding one of control signals, OSY_VNEG1 through OSY_VNEGN (not explicitly shown, but represented by signal OSY_VNEG), the magnitude of the overshoot current pulse can be precisely controlled.

Pull-up write driver 306 is adapted to receive a fifth control signal, DATAX_VCC, a sixth control signal, OSX_VCC, and a second bias signal VBIASP. As previously stated, signal DATAX_VCC, which is comparable to signal DATA_VCC described in conjunction with FIG. 2, controls activation of an output transistor device Q21A in write driver 306 (comparable to Q21 in FIG. 2). Thus, when at a high level (e.g., 5.0 volts, assuming an upper voltage supply rail of 5.0 volts), signal DATAX_VCC disables output transistor device Q21A and enables charging of capacitor 318 in a manner consistent with that previously described in connection with the operation of write driver circuit 200 shown in FIG. 2. Signal OSX_VCC, which is comparable to signal OS_VCC described in conjunction with FIG. 2, is operative to control a duration of the overshoot current pulse generated by the write circuit 300 and VBIASP is operative to control overshoot current amplitude. In an alternative embodiment in which the PFET device adapted to receive control signal OSX_VCC is formed as an array of M parallel-connected MOS segments, each segment is independently controlled by a corresponding one of control signals, OSX_VCC1 through OSX_VCCM (not explicitly shown, but represented by signal OSX_VCC), where M is an integer, the magnitude of the overshoot current pulse can be precisely controlled.

Likewise, pull-down write driver 308 is adapted to receive a seventh control signal, DATAY_VCC, an eighth control signal, OSY_VCC, and the bias signal VBIASP. Signal DATAY_VCC, which is comparable to signal DATA_VCC described in conjunction with FIG. 2, controls activation of output transistor device Q21B in write driver 308 (comparable to Q21 in FIG. 2). Thus, when at a high level (e.g., 5.0 volts), signal DATAY_VCC disables output transistor device Q21B and enables charging of capacitor 320 in a manner consistent with that previously described in connection with the operation of write driver circuit 200 shown in FIG. 2. Signal OSY_VCC, which is comparable to signal OS_VCC described in conjunction with FIG. 2, is operative to control a duration of the overshoot current pulse generated by the write circuit 300 and VBIASP is operative to control overshoot current amplitude. In an alternative embodiment in which the PFET device adapted to receive control signal OSY_VCC is formed as an array of M parallel-connected MOS segments, each segment is independently controlled by a corresponding one of control signals, OSY_VCC1 through OSY_VCCM (not explicitly shown, but represented by signal OSY_VCC), the magnitude of the overshoot current pulse can be precisely controlled.

With proper activation of the control signals DATAX_VCC, DATAY_VCC, DATAX_VNEG, DATAY_VNEG, and overshoot enable signals OSX_VCC, OSY_VCC, OSX_VNEG and OSY_VNEG, a polarity of write current supplied to the write head 310 can be controlled. For example, when write drivers 306 and 304 are enabled, write driver 306 will serve as a current source and write driver 304 will serve as a current sink, such that an overshoot write current pulse will be supplied to the writ head 310 in a direction from node HWX to node HWY. A duration of the overshoot write current pulse in this scenario will be controlled as a function of enable signals OSX_VCC and OSY_VNEG. Alternatively, when write drivers 308 and 302 are enabled, write driver 308 will serve as the current source and write driver 302 will serve as the current sink, such that the overshoot write current pulse will be supplied to the write head 310 in a direction from node HWY to node HWX. A duration of the overshoot write current pulse in this scenario will be controlled as a function of enable signals OSY_VCC and OSX_VNEG.

The bias signals VBIASP and VBIASN used by the write drivers 302, 304, 306 and 308 are generated by corresponding bias generator circuits 322 and 324, respectively, in the write circuit 300. It is to be appreciated, however, that one or more of these bias signals, in accordance with other embodiments, can be generated externally and supplied to the write circuit 300. Bias generator circuit 322 includes a PFET MP1, and a diode-configured PNP BJT Q31 connected together in series with a reference current source 326. Specifically, a source of MP1 is adapted for connection with the upper voltage supply rail VCC, a drain of MP1 is connected with an emitter of Q31, a gate of MP1 is adapted to receive a bias control signal, VN12_VCC, a base and collector of Q31 are connected with a first node of the reference current source 326, and a second node of the reference current source 326 is adapted for connection with reference voltage VN33_VCC. PFET MP1 is operative essentially as a switch for enabling/disabling the bias generator 322 as a function of the bias control signal VN12_VCC. In this manner, Q31 and the corresponding transistors connected therewith in write drivers 306 and 308 are configured as a simple current mirror. It is to be understood that embodiments of the invention are not limited to any specific bias generator circuit arrangements.

Similarly, bias generator circuit 324 includes an NFET MN1, and a diode-configured NPN BJT Q32 connected together in series with a reference current source 328. Specifically, a source of MN1 is adapted for connection with the lower voltage supply rail VNEG, a drain of MN1 is connected with an emitter of Q32, a gate of MN1 is adapted to receive a bias control signal, VN12_VNEG, a base and collector of Q32 are connected with a first node of the reference current source 328, and a second node of the reference current source 328 is adapted for connection with reference voltage VN33_VNEG. NFET MN1 is operative essentially as a switch for enabling/disabling the bias generator 324 as a function of the bias control signal VN12_VNEG. In this manner, Q32 and the corresponding transistors connected therewith in write drivers 302 and 304 are configured as a simple current mirror. It is to be understood that embodiments of the invention are not limited to any specific bias generator circuit arrangements.

Figure 4:
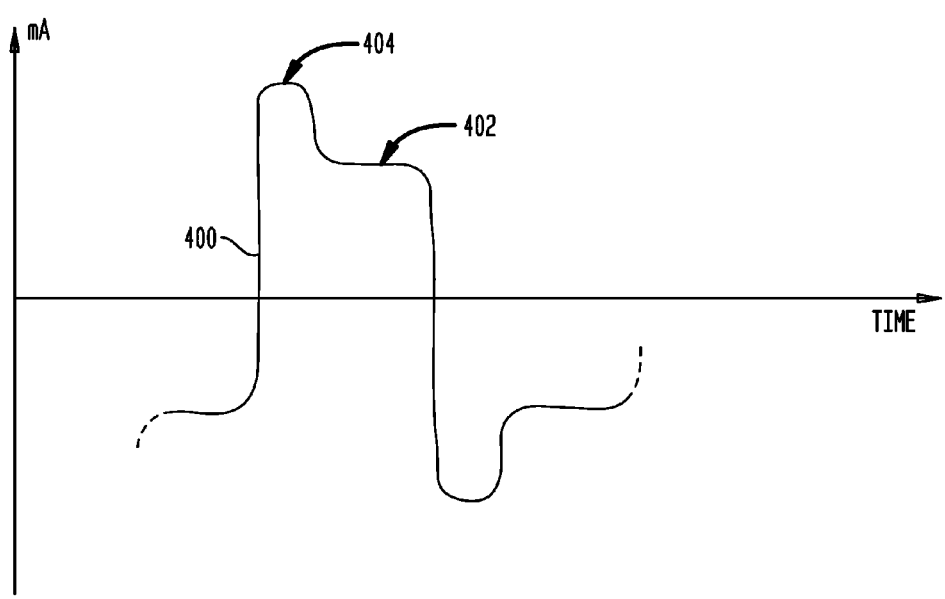
FIG. 4 conceptually depicts an exemplary write current waveform which may be generated by the write circuit shown in FIG. 3.

The write circuit 300 also includes a pair of amplifiers 330 and 332 coupled with nodes HWX and HWY, respectively, of the write head interconnect 312 via corresponding interconnect impedance matching networks 331 and 333. A first amplifier 330 is adapted to receive a first write data signal, DATAX and a second amplifier 332 is adapted to receive a second write data signal DATAY. Amplifiers 330 and 332, which can be implemented using any amplifier circuit as will be known by those skilled in the art, are representative of steady-state driver circuits generally employed in a write preamplifier circuit. FIG. 4 conceptually depicts an exemplary write current waveform 400 which may be generated by the write circuit 300 shown in FIG. 3. With reference to FIG. 4, the write current waveform 400 comprises a steady-state current portion 402 and an overshoot current 404. Amplifiers 330 and 332 generate the steady-state current 402, while the write drivers 302, 304, 306 and 308 generate the overshoot current 404. When write data signal DATAX is high and write data signal DATAY is low, a positive steady-state current will flow from node HWX to node HWY. Similarly, when DATAY is high and DATAX is low, a negative steady-state current will flow from node HWY to node HWX.

Figure 5:
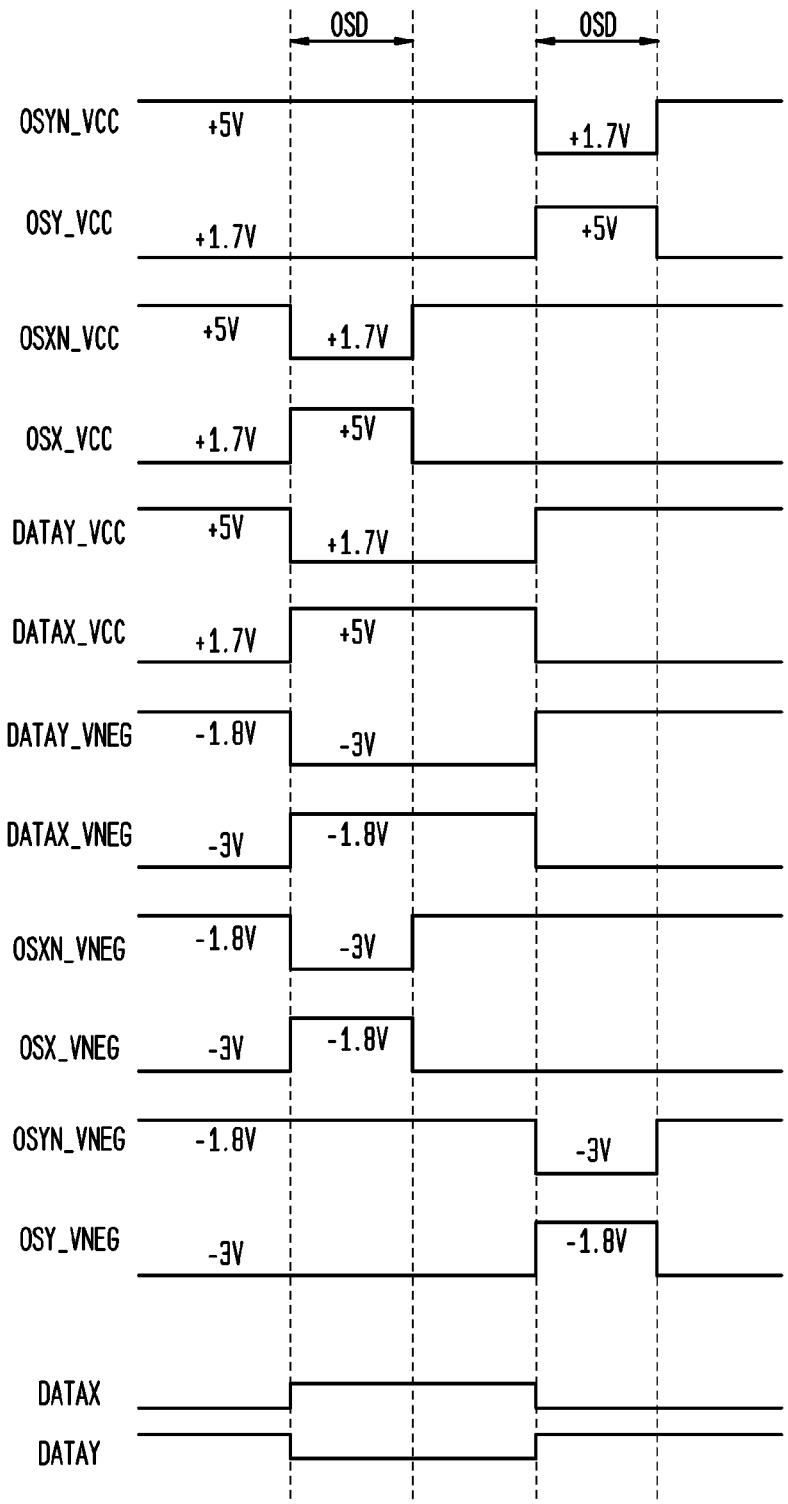
FIG. 5 is an exemplary timing diagram conceptually depicting signals associated with the illustrative write circuit shown in FIG. 3, according to an embodiment of the invention.

FIG. 5 is an exemplary timing diagram conceptually depicting signals associated with the illustrative write circuit 300 shown in FIG. 3, according to an embodiment of the invention. With reference FIG. 5, a sequence of DATA signals (e.g., DATAY_VCC, DATAX_VCC, DATAY_VNEG, DATAX_VNEG) and OS signals (e.g., OSYN_VCC, OSY_VCC, OSXN_VCC, OSX_VCC, OSXN_VNEG, OSX_VNEG, OSYN_VNEG, OSY_VNEG) is shown to allow overshoot and steady-state currents to flow in both polarities in relation to the write data signals DATAX and DATAY supplied to the write circuit 300 of FIG. 3. A detailed explanation of the operation of the write circuit as a function of the DATA and OS signals was previously presented in conjunction with FIGS. 1-3. As apparent from FIG. 5, a duration of the overshoot current pulse, OSD, is controlled as a function of the OS signals supplied to the respective write driver circuits 302, 304, 306 and 308.

At least a portion of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which magnetic storage and retrieval devices may be employed. Suitable applications and systems for implementing techniques according to embodiments of the invention may include, but are not limited to, hard disk drive systems, amplifiers, input/output interface circuitry, controllers, power management, etc. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A write driver circuit for generating a write current pulse for use by a magnetic write head, the write driver circuit comprising:
   an output stage adapted for connection with the magnetic write head;
   a charge storage circuit connected with the output stage, the charge storage circuit being operative in a first mode to store a prescribed charge and being operative in a second mode to transfer at least a portion of the charge stored therein to the output stage to thereby enable an output voltage level of the output stage to extend beyond a voltage supply rail of the write driver circuit; and
   a control circuit operative to generate at least one control signal for selectively controlling a mode of operation of the charge storage circuit;
   wherein the charge storage circuit comprises:
   a capacitive element having a first node connected with the magnetic write head through the output stage;
   a diode adapted for connection between the first node of the capacitive element and the voltage supply rail; and
   a current source coupled with a second node of the capacitive element and operative to supply a charging current to the capacitive element during the first mode.

2. The write driver circuit of claim 1, wherein the output stage comprises at least one bipolar junction transistor including a collector operatively coupled with the magnetic write head, a base adapted for connection with the voltage supply rail, and an emitter connected with the charge storage circuit.

3. The write driver circuit of claim 1, wherein the output stage comprises at least one metal-oxide-semiconductor (MOS) transistor including a first source/drain operatively coupled with the magnetic write head, a gate adapted for connection with the voltage supply rail, and a second source/drain connected with the charge storage circuit.

4. The write driver circuit of claim 1, wherein
a magnitude of the charging current is controlled as a function of at least a first control signal generated by the control circuit.

5. The write driver circuit of claim 1, wherein the diode comprises a bipolar junction transistor having an emitter connected with the capacitive element and having a base and a collector adapted for connection with the voltage supply rail.

6. The write driver circuit of claim 1, wherein the diode comprises a metal-oxide-semiconductor transistor having a first source/drain connected with the capacitive element and having a gate and a second source/drain connected with the voltage supply rail.

7. The write driver circuit of claim 1, wherein the current source comprises a first bipolar junction transistor having a collector adapted to receive a prescribed current, an emitter connected with the second node of the capacitive element, and a base adapted to receive the first control signal.

8. The write driver circuit of claim 7, wherein the current source further comprises a second bipolar junction transistor and a metal-oxide-semiconductor (MOS) transistor, a collector of the second bipolar junction transistor being connected with the second node of the capacitive element, an emitter of the second bipolar junction transistor being connected with a first source/drain of the MOS transistor, a base of the second bipolar junction transistor being adapted to receive a bias signal, a second source/drain of the MOS transistor being adapted for connection with the voltage supply rail, and a gate of the MOS transistor being adapted to receive a second control signal, wherein a duration of at least an overshoot portion of the write current pulse is controlled as a function of the second control signal and an amplitude of the overshoot portion of the write current pulse is controlled as a function of the bias signal.

9. The write driver circuit of claim 7, wherein the collector of the first bipolar junction transistor is adapted for connection with a reference voltage.

10. The write driver circuit of claim 1, wherein the current source comprises a programmable current source operative to receive a plurality of control signals and to generate the charging current having a magnitude which is controlled as a function of the plurality of control signals.

11. The write driver circuit of claim 10, wherein the programmable current source comprises a plurality of parallel-connected metal-oxide-semiconductor transistor segments, each of the segments being independently controlled as a function of a corresponding one of the plurality of control signals.

12. The write driver circuit of claim 1, wherein the control circuit comprises:
a resistor having a first node adapted for connection with a reference voltage and a second node connected with the charge storage circuit; and
a current source coupled with the second node of the resistor, the current source being operative during the first mode to enable charging of the charge storage circuit to store the prescribed charge, the current source being operative during the second mode to disable charging of the charge storage circuit.

13. The write driver circuit of claim 1, wherein the write driver circuit is fabricated in at least one integrated circuit.

14. A write circuit for generating a write current pulse for use by a magnetic write head, the write circuit comprising:
first and second pull-up write drivers, each of the first and second pull-up write drivers being adapted for connection with a first voltage supply rail of the write circuit, the first pull-up write driver having a first output coupled with a first node of the magnetic write head, the second pull-up write driver having a second output coupled with a second node of the magnetic write head; and
first and second pull-down write drivers, each of the first and second pull-down write drivers being adapted for connection with a second voltage supply rail of the write circuit, the first pull-down write driver having a third output coupled with the first node of the magnetic write head, the second pull-down write driver having a fourth output coupled with the second node of the magnetic write head;
each of the respective write drivers comprising:
an output stage adapted for connection with the magnetic write head;
a charge storage circuit connected with the output stage, the charge storage circuit being operative in a first mode to store a prescribed charge and being operative in a second mode to transfer at least a portion of the charge stored therein to the output stage to thereby enable an output voltage level of the output stage to extend beyond a corresponding one of the first and second voltage supply rails of the write circuit; and
a control circuit operative to generate at least one control signal for selectively controlling a mode of operation of the charge storage circuit;
wherein the charge storage circuit in each of at least a subset of the respective write drivers comprises:
a capacitive element having a first node connected with the magnetic write head through the output stage;
a diode adapted for connection between the first node of the capacitive element and a corresponding one of the first and second voltage supply rails; and
a current source coupled with a second node of the capacitive element and operative to supply a charging current to the capacitive element during the first mode.

15. The write circuit of claim 14, wherein the first and second pull-up write drivers are not active concurrently relative to one another, and wherein the first and second pull-down write drivers are not active concurrently relative to one another.

16. The write circuit of claim 14, wherein the first pull-up write driver and the second pull-down write driver are active concurrently, and wherein the second pull-up write driver and the first pull-down write driver are active concurrently.

17. The write circuit of claim 14, further comprising:
a first amplifier having an output coupled with the first node of the magnetic write head and having an input adapted to receive a first write data signal; and
a second amplifier having an output coupled with the second node of the magnetic write head and having an input adapted to receive a second write data signal.

18. The write circuit of claim 17, further comprising first and second impedance matching networks, the first impedance matching network connected between the output of the first amplifier and the first node of the magnetic write head, the second impedance matching network connected between the output of the second amplifier and the second node of the magnetic write head.

19. The write circuit of claim 14, further comprising:

a first bias circuit coupled with the first and second pull-up write drivers and operative to generate a first bias signal for controlling an overshoot current amplitude of the write pulse generated by each of the first and second pull-up write drivers; and a second bias circuit coupled with the first and second pull-down write drivers and operative to generate a second bias signal for controlling an overshoot current amplitude of the write pulse generated by each of the first and second pull-down write drivers.

20. The write circuit of claim 14, wherein a magnitude of the charging current is controlled as a function of at least a first control signal generated by the control circuit.

21. The write circuit of claim 20, wherein the current source in each of at least a subset of the respective write drivers comprises a first bipolar junction transistor having a collector adapted for connection with a first reference voltage, an emitter connected with the second node of the capacitive element, and a base adapted to receive the first control signal.

22. The write circuit of claim 21, wherein the current source in each of at least a subset of the respective write drivers further comprises a second bipolar junction transistor and a metal-oxide-semiconductor (MOS) transistor, a collector of the second bipolar junction transistor connected with the second node of the capacitive element, an emitter of the second bipolar junction transistor connected with a first source/drain of the MOS transistor, a base of the second bipolar junction transistor adapted to receive a bias signal, a second source/drain of the MOS transistor adapted for connection with a corresponding one of the first and second voltage supply rails, and a gate of the MOS transistor adapted to receive a second control signal, wherein a duration of at least an overshoot portion of the write current pulse is controlled as a function of the second control signal and an amplitude of the overshoot portion of the write current pulse is controlled as a function of the bias signal.

23. The write circuit of claim 20, wherein the current source in each of at least a subset of the respective write drivers comprises a programmable current source operative to receive a plurality of control signals and to generate the charging current having a magnitude which is controlled as a function of the plurality of control signals.

24. The write circuit of claim 14, wherein the control circuit in each of at least a subset of the respective write drivers comprises:

a resistor having a first node adapted for connection with a reference voltage and a second node connected with the charge storage circuit; and a current source coupled with the second node of the resistor, the current source being operative during the first mode to enable charging of the charge storage circuit to store the prescribed charge, the current source being operative during the second mode to disable charging of the charge storage circuit.

25. The write circuit of claim 14, wherein the write circuit is fabricated in at least one integrated circuit.

26. A data storage and retrieval system, comprising:

a magnetic write head operative to store binary encoded information as magnetic flux patterns imparted on a magnetic storage medium as the medium passes by the write head as a function of a write current pulse supplied to the write head; and a write circuit for generating the write current pulse, the write circuit comprising:

first and second pull-up write drivers, each of the first and second pull-up write drivers being adapted for connection with a first voltage supply rail of the write circuit, the first pull-up write driver having a first output coupled with a first node of the magnetic write head, the second pull-up write driver having a second output coupled with a second node of the magnetic write head; and first and second pull-down write drivers, each of the first and second pull-down write drivers being adapted for connection with a second voltage supply rail of the write circuit, the first pull-down write driver having a third output coupled with the first node of the magnetic write head, the second pull-down write driver having a fourth output coupled with the second node of the magnetic write head;

each of the respective write drivers comprising:

an output stage adapted for connection with the magnetic write head;

a charge storage circuit connected with the output stage, the charge storage circuit being operative in a first mode to store a prescribed charge and being operative in a second mode to transfer at least a portion of the charge stored therein to the output stage to thereby enable an output voltage level of the output stage to extend beyond a corresponding one of the first and second voltage supply rails of the write circuit; and a control circuit operative to generate at least one control signal for selectively controlling a mode of operation of the charge storage circuit;

wherein the charge storage circuit in each of at least a subset of the respective write drivers comprises:

a capacitive element having a first node connected with the magnetic write head through the output stage;

a diode adapted for connection between the first node of the capacitive element and a corresponding one of the first and second voltage supply rails; and a current source coupled with a second node of the capacitive element and operative to supply a charging current to the capacitive element during the first mode.

\* \* \* \* \*